United States Patent
Song

(10) Patent No.: US 10,732,297 B2
(45) Date of Patent: Aug. 4, 2020

(54) GEO-PAIRING DETECTION

(71) Applicant: Faraday&Future Inc., Gardena, CA (US)

(72) Inventor: Xiufeng Song, San Jose, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 273 days.

(21) Appl. No.: 15/690,168

(22) Filed: Aug. 29, 2017

(65) Prior Publication Data

US 2018/0246222 A1   Aug. 30, 2018

Related U.S. Application Data

(60) Provisional application No. 62/381,241, filed on Aug. 30, 2016.

(51) Int. Cl.
| | |
|---|---|
| *G01S 19/51* | (2010.01) |
| *G01S 19/52* | (2010.01) |
| *G01S 5/02* | (2010.01) |
| *H04W 4/029* | (2018.01) |
| *G01S 19/14* | (2010.01) |

(52) U.S. Cl.
CPC ............ *G01S 19/51* (2013.01); *G01S 5/0284* (2013.01); *G01S 5/0289* (2013.01); *G01S 19/52* (2013.01); *G01S 5/0221* (2013.01); *G01S 19/14* (2013.01); *H04W 4/029* (2018.02)

(58) Field of Classification Search
CPC .......... G01S 19/51; G01S 19/52; G01S 19/14; G01S 5/0221; G01S 5/0284; G01S 5/0289; H04W 4/029
USPC ............... 342/357.34, 357.52, 465
See application file for complete search history.

(56) References Cited

U.S. PATENT DOCUMENTS

| | | | | |
|---|---|---|---|---|
| 5,563,607 | A * | 10/1996 | Loomis | G01S 19/07 342/357.44 |
| 6,275,707 | B1 * | 8/2001 | Reed | G01S 5/0072 342/357.31 |
| 7,769,393 | B2 * | 8/2010 | Jendbro | G01S 19/05 342/357.46 |
| 7,847,727 | B2 * | 12/2010 | Hensley | A01K 11/008 342/357.32 |
| 8,165,605 | B2 * | 4/2012 | Andreasson | H04W 4/029 455/456.3 |
| 9,541,648 | B2 * | 1/2017 | Ralphs | G01C 21/20 |

(Continued)

*Primary Examiner* — Chuong P Nguyen
(74) *Attorney, Agent, or Firm* — Veros Legal Solutions, LLP

(57) ABSTRACT

Various techniques related to determining whether mobile devices are associated are described. The techniques can include receiving first position information from a first device and receiving second position information from a second device. The techniques can also include comparing the first position information to the second position information over an overlapping time period. The techniques can additional include determining, based on the comparing, whether first position information and the second position information indicate that the first device and the second device are collocated during the overlapping time period. The techniques can include, upon determining that the first position information and the second position information indicate that the first device and the second device are collocated during the overlapping time period, determining that the first device and the second device are associated.

20 Claims, 8 Drawing Sheets

(56) References Cited

U.S. PATENT DOCUMENTS

| | | | |
|---|---|---|---|
| 10,178,502 B2 * | 1/2019 | Barlev | H04W 4/029 |
| 10,362,124 B2 * | 7/2019 | Yoshida | H04L 67/22 |
| 2007/0161380 A1 * | 7/2007 | Fok | G01S 5/0009 |
| | | | 455/456.1 |
| 2009/0079622 A1 * | 3/2009 | Seshadri | G01C 21/00 |
| | | | 342/357.42 |
| 2015/0347895 A1 * | 12/2015 | Glickfield | H04W 4/21 |
| | | | 706/16 |
| 2018/0143327 A1 * | 5/2018 | Song | G01S 19/48 |

\* cited by examiner

Unsynchronized Data Stream Interpolation

Unsynchronized Post-Process Data Stream Interpolation

GEO-PAIRING DETECTION

CROSS-REFERENCE TO RELATED APPLICATIONS

This application claims the benefit of U.S. Provisional Application No. 62/381,241, filed Aug. 30, 2016, the entirety of which is hereby incorporated by reference.

BACKGROUND

Determining associations between users of mobile devices can be useful in a variety of ways to enhance functionality of mobile devices (e.g., smartphones, watches, etc.). These associations can indicate whether users of mobile devices are friends, communicate often, or are otherwise related. Certain techniques for determination association include manual selection of associations. For example, two users can be "friends" on a social media platform by manually indicating that they are friends via a user interface of the social media platform. This association can allow the users to enhance their interaction with each other through the social media platform. However, manually selecting associations between users can limit opportunities to provide enhanced functionality to associated users. Consequently, ways of improving detection of user associations through use of mobile devices are desirable.

SUMMARY

The present disclosure describes various techniques that relate to improving detection of user associations through use of mobile devices. Disclosed are techniques for determining geographic associations. The techniques can include receiving first position information from a first Global Navigation Satellite System (GNSS) receiver of a first device, wherein the first position information comprises a first plurality of position estimates of the first device, the first plurality of position estimates associated with a first plurality of time stamps within a first time period. The techniques can also include receiving second position information from a second GNSS receiver of a second device, wherein the second position information comprises a second plurality of position estimates of the second device, the second plurality of position estimates associated with a second plurality of time stamps within a second time period wherein a portion of the second time period overlaps with the first time period. The techniques can additionally include comparing the first position information to the second position information over the overlapping time period. The techniques can further include determining, based on the comparing, whether first position information and the second position information indicate that the first device and the second device are collocated during the overlapping time period. The techniques can include, upon determining that the first position information and the second position information indicate that the first device and the second device are collocated during the overlapping time period, determining that the first device and the second device are associated.

The determining whether first position information and the second position information indicate that the first device and the second device are collocated during the overlapping time period can include determining whether a difference between position estimates of the first position information and position estimates of the second position information meets a threshold. The overlapping time period can include at least one intervening time period wherein the first device and the second device are not collocated. The first position information can include velocity information for the first device and the second position information can include velocity information for the second device, wherein the determining whether first position information and the second position information indicate that the first device and the second device are collocated during the overlapping time period can be based on the velocity information for the first device and the velocity information for the second device.

The comparing the first position information to the second position information over the overlapping time period can include determining a difference between each of the first plurality of position estimates and a corresponding one of the second plurality of position estimates. The comparing can include determining an average of the differences. The comparing can comprise applying a weighting to components of the average of the differences. The components can each indicate a direction in three dimensional space. The weighting can weight a first components of the components differently from a second component of the components. The first component can indicate a position lateral to a surface of the earth, the second element can indicate an elevation above the surface of the earth, and the weighting of the first component can be greater than the weighting of the second component. The weighting can include performing a matrix operation, wherein the matrix operation can include multiplying a first matrix including the components of the average of the differences with a diagonal matrix including weighting factors.

The techniques can further include receiving third position information from a third GNSS receiver of a third device, wherein the third position information comprises a third plurality of position estimates of the third device, the third plurality of position estimates associated with a third plurality of time stamps, wherein the third position information includes position estimates within a third time period wherein a portion of the third time period overlaps with the first time period and the second time period. The techniques can also include comparing the first position information, the second position information, and the third position information over the overlapping time period. The techniques can additionally include determining, based on the comparing, whether first position information, the second position information, and the third position information indicate that the first device, the second device, and the third device are collocated together during the overlapping time period. The techniques can also include, upon determining that the first position information, the second position information, and the third position information indicate that the first device, the second device, and the third device are collocated during the overlapping time period, determining that the first device, the second device, and the third device are associated.

The respective position estimates of each of the first position information, the second position information, and the third position information can each include a position estimate in multi-dimensional space. The techniques can further include determining a geometric center for each of the position estimates. The techniques can also include comparing each of the position estimates with the geometric center. The techniques can also include time synchronizing, based on the first plurality of time stamps and the second plurality of time stamps, the second position information with the first position information. The determining whether the first device and the second device are collocated can include determining whether the first device and the second device move together during the overlapping time period.

BRIEF DESCRIPTION OF THE DRAWINGS

The disclosure will be readily understood by the following detailed description in conjunction with the accompanying drawings, wherein like reference numerals designate like structural elements, and in which.

Figure 1:
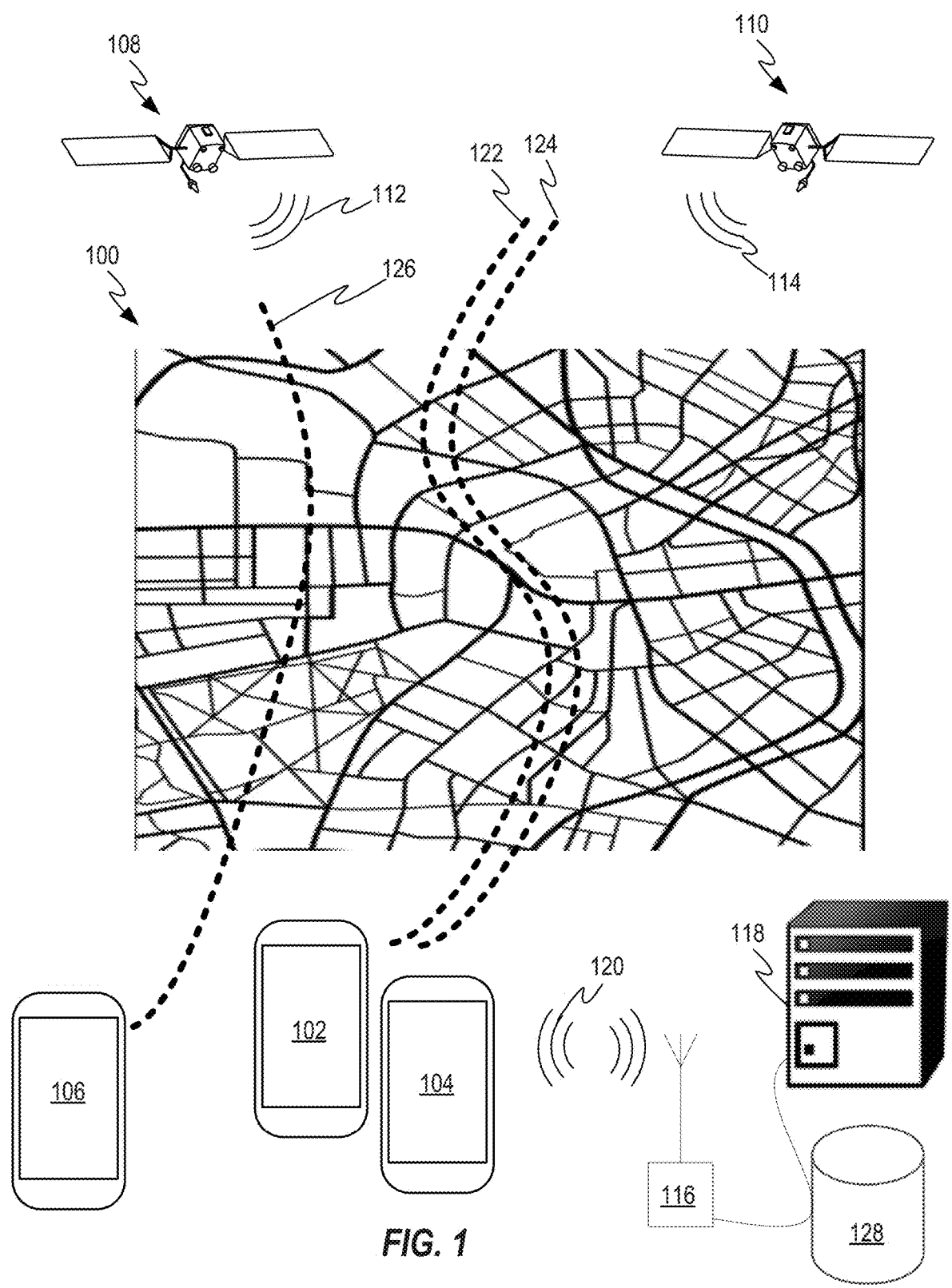
FIG. 1 illustrates paths of mobile devices over time to illustrate features of the disclosure.

Other aspects and advantages of the invention will become apparent from the following detailed description taken in conjunction with the accompanying drawings which illustrate, by way of example, the principles of the described embodiments.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Mobile devices are becoming routinely used and carried by individuals as they conduct their daily tasks. For example, many people carry smartphones with them throughout the day to communicate with friends, entertain themselves, conduct business, etc. Being able to determine that users of mobile devices (such as smartphones, smart watches, tablets, etc.) are associated can be used to offer enhanced functionality to the users. For example, knowing that two users are associated can enable information to be provided to the two users that may be beneficial to the associated users.

An association, as used herein, can indicate a relationship between two users. For example, the two users may live together, may eat lunch together, or otherwise may routinely spend time in close proximity with each other. An association can be used to, for example, provide travel suggestions or eatery suggestions to associated users based on their association and/or additional information. For example, techniques of the disclosure can be used to determine whether two users frequent a restaurant or a type of restaurant routinely during lunch hours. Using this information, improved travel information can be provided to the users, restaurant suggestions can be provided, and/or special events can be communicated to the associated users. In certain embodiments, entertainment preferences of users can be used to suggest or improve entertainment delivery to associated users. For example, one user can be determined to consume certain types of entertainment. Similar types of entertainment options can be suggested to a user associated with the first. In certain embodiments, emergency information can be provided to an associated user if it is determined, for example, that a user has strayed from their usual routine (e.g., has been abducted, has been in a traffic accident, etc.). In certain embodiments, an association can be used to enable privileged information to be transferable between associated users. In certain embodiments, carpool information can be suggested to associated users. The preceding are several non-limiting examples of ways in which associating two users can be used to enhance functionality of mobile devices of the users. Additional enhancements to mobile devices not specifically disclosed are within the scope of the techniques of this disclosure.

An association between two (or more) users can be determined based on position information determined from mobile devices each associated with a user (i.e., by determining an association between mobile devices of the users). The position information can be determined using satellite-based navigation system, often referred to as a Global Navigation Satellite System (GNSS). The association can be made without being directly indicated by a user. For example, a user need not manually input information indicating that another user is to be associated. Instead, position information can be gathered from the mobile devices. Trend information can be determined from the position information indicating that the mobile devices are collocated and/or move together during time period(s). The determination of the collocation and/or the moving together of two devices can be determined using comparison techniques. For example, if it is determine that two mobile device are collocated a certain distance from each other over one or more time periods, the mobile devices can be associated (indicating that users of the mobile devices are associated) if the distance meets a threshold. In certain embodiments, movement over an overlapping time period of two mobile devices can be used to determine an association between the two devices.

In certain embodiments, techniques can be used that can be implemented to determine the disclosed associations while minimizing overhead to make the determination. The overhead can include processing, computing, or other resources of a computer device. An example computer device can be a server coupled to, for example, a cellular (or other) data exchange network. In certain embodiments, a server can gather position information from two or more mobile devices. The position information can be determined through the use of a GNSS receiver of each of the mobile devices. The position information can be gathered in real time or submitted in batches via a data exchange network for processing by the server. The server can, utilizing the position information, determine whether certain ones of the two or more mobile devices are associated.

Comparing position information can also include synchronizing times at which location measurements were taken by mobile devices. Because devices with GNSS receivers receive GNSS time from the GNSS Satellites, it may not be necessary to perform a device clock synchronization step. For example, each device clock can be synchronized with a common GNSS clock. Even though the device clocks can be synchronized, the devices may not record position data at the same rate and/or time. This can be problematic and particularly problematic when a user of the devices is travelling at high speeds. Consequently, data from at least one of the devices can be time synchronized to match the data from the other device(s) prior to combining location data across multiple devices.

These and other embodiments are discussed below with reference to FIGS. 1-8, however, those skilled in the art will readily appreciate that the detailed description given herein with respect to these figures is for explanatory purposes only and should not be construed as limiting.

FIG. 1 illustrates paths of mobile devices over time to illustrate features of the disclosure. Shown in FIG. 1 is a map 100 to illustrate various paths that mobile devices can take to travel between two different geographic locations. For example, mobile device 102 is illustrates as traversing map 100 via path 122. While mobile device 102 traverses map 100, a plurality of position estimates can be determined by mobile device 102 via, for example, a GNSS receiver of mobile device 102 (not shown). A GNSS receiver can use signals 112 and 114 from positioning satellites 108 and 110 to determine a position of mobile device 102. The position information can be collected over one or more time periods wherein each time period can include on or more position estimates. In certain embodiments, the position estimates can be time-stamped indicating a time at which the position estimate is determined. As disclosed herein, a timestamp can be synchronized to a GNSS clock. Position estimates can include an instantaneous location in multidimensional space, instantaneous velocity information, instantaneous acceleration information, and/or other information useful for determining a path of a mobile device. The position information (including a location, velocity, and/or acceleration) can include components wherein each component represent a dimension in multidimensional space. For example, a location, velocity, or acceleration, can include an x, y, and z component. In certain embodiments, the x and y components can represent components lateral to a surface of the earth. The z component can represent a component representing an elevation from the surface of the earth.

Position information can be gathered individually by each of several mobile devices (such as mobile devices 102, 104, and 106). Mobile device 102 is illustrated as being associated with path 122, mobile device 104 is illustrated as being associated with path 124, and mobile device 106 is illustrated as being associated with path 126. Paths 122 and 124 are illustrated as being more congruent than path 126. As used herein, the term "congruent" indicates that two paths of mobile devices indicate that the mobile devices are in close proximity during a certain time period. Thus, paths 122, 124, and/or 126 can correspond to discrete position estimates determined during a certain time period and/or may be further delineated into several time periods each containing discrete position estimates. The degree of proximity to determine when two paths are congruent can be selected based upon various conditions, as disclosed herein. In certain embodiments, the determination that paths 122 and 124 are relatively congruent (for a time period) can be used to associate mobile device 102 with mobile device 104. A determination that path 126 is relatively incongruent with paths 122 or 124 can be used to determine that mobile device 106 should not be associated with mobile device 102 or 104. Each of paths 122, 124, and 126 can include a plurality of discrete position estimates, as disclosed herein. The discrete position estimates can be captured with corresponding discrete time stamps. The time stamps can indicate the time at which each position estimate was determined. As disclosed herein, the use of the position estimates and corresponding time stamps can be used to determine if two mobile device have traveled through congruent paths during time period(s) and therefore should be associated.

It should be understood that FIG. 1 illustrates examples of routes compared to paths that are not necessarily to scale. Thus, determination of whether two mobile devices are to be associated can be non-trivial, especially when taking into account inconsistencies of user paths, inconsistencies with position information measurements, or other information. Furthermore, FIG. 1 only illustrates three mobile devices (102, 104, and 106) with corresponding paths (122, 124, and 126 respectively). In certain embodiments, paths can be stored as discrete position estimates and techniques are disclosed to determine, based on analysis of the discrete position estimates, whether two (or more) mobile devices corresponding to certain subsets of discrete position estimates should be associated. In certain embodiments, techniques can be used to determine from position estimates corresponding to a relatively large number of mobile devices, whether certain position estimates indicate that mobile devices travel through paths of sufficient congruity to determine that the mobile devices should be associated. For example, certain mobile devices may intersect paths because users of the mobile device happen to walk in close proximity to each other. In certain embodiments, techniques are disclosed that can differentiate from "chance" occurrences of mobile devices being in proximity and occurrence of systematic, association-indicative, pattern(s) of proximity/movement of mobile devices. In certain embodiments, the techniques can operate systematically without human input to determine whether mobile devices should be associated based upon position estimate(s) of the mobile devices.

Techniques of the disclosure can be implemented in conjunction with or by server 118, mobile devices 102, 104, or 106, or any computer device or combination of computer devices. Server 118 can be located remotely from mobile devices 102, 104, and 106. Server 118 can be located on a data exchange network service provider. For example, server 118 can be located on a cellular provider's network. Server 118 can be coupled to base station 116. Base station 116 can communicate with mobile devices 102, 104, and 106. Communication 120 can comprise wireless communication using cellular communication techniques (e.g., code division multiple access, global system for mobile communication, or other). Server 118 can be coupled to database 128. Database 128 can be configured to store position information indicating, for example, positions along paths 122, 124, and 126. As disclosed herein, position information can be accumulated in database 128 for batch processing by server 118, can be examined in real time by server 118, or other.

Pairwise Association Determination

Server 118 can, in certain embodiments, collect discrete position estimates of a mobile device (along one of the paths 122, 124, or 126, for example) according to the following format: $m=\{x, y, z, v_x, v_y, v_z\}$, wherein m represents a discrete position estimate, x, y, and z represent location components in three dimensional space, and $v_x$, $v_y$, and $v_z$ represent velocity components in three dimensional space. The velocity components can represent an instantaneous velocity of a mobile device at a certain time. While position and velocity are illustrated in this example, other parameters can be included such as acceleration. Each position estimate can thus be represented as a vector representing a mobile device's instantaneous position, velocity, acceleration, and/or other information. A mobile device's path can be modeled by a representation of a plurality of sampled discrete position estimates represented by the following equation: $Z_A = \{m_A(t_1), m_A(t_2), \ldots, m_A(t_K)\}$ wherein Z represents position information (a plurality of position estimates) for a mobile device, m represents a discrete position estimate, t represents a time to which each discrete position estimate corresponds to, and K represents the total number of discrete position estimates.

In certain embodiments, several sets of position information (each represented by a corresponding sample set Z) can be gathered by server 118. A set of position information can correspond to a mobile device or multiple sets of position information can correspond to a single mobile device. Server 118 can examine collected position information sets to determine whether different mobile devices should be associated by determining, for example, if the mobile devices are collocated or moving together. It should be understood that a vast number of mobile devices can be thus evaluated via a data exchange network and can each provide position information in the form of one or more sets of position information. The amount of storage and processing requirements to determine potential associations among a large number of mobile devices can become excessive. Disclosed are techniques that can be implemented by a computer device, such as server 118, to process relatively large amounts of data corresponding to positions of mobile devices and determine whether the mobile devices should be associated. The techniques can be implemented with relatively little processing overhead.

In certain embodiments, server 118 can implement a threshold-based approach to determine if two mobile devices should be associated. The threshold-based approach can include comparing two or more sets of position information to determine whether two mobile devices should be associated including determining whether a similarity between two data sets meets a threshold. A threshold-based approach can include, in certain embodiments, averaging sample sets. Averaging can be used to cancel out noise-induced inaccuracies in sample sets. Noise can be introduced via, for example, environmental effects (attenuation of GNSS reception signals, electromagnetic noise, solar flares, etc.), performance differences between GNSS receivers, data integrity differences, etc. In certain embodiments, noise can be included in the determination if mobile devices are associated. Noise can be modeled using a Gaussian or other distribution.

A threshold-based approach can include computing a difference between each position estimate within a plurality of position estimates. For example, the differences can be represented by the equation: $\Delta(t_n)=m_A(t_n)-m_B(t_n)$, wherein $\Delta$ represents a difference, m represents a discrete position estimate (corresponding to a specific mobile device each respectively represented by subscripts A and B), and t represents a time. The differences can be collected for $1 \leq n > K$, wherein K is a total number of discrete position estimates. For this example, the discrete position estimates are assumed to be time-aligned. Disclosed herein are techniques to time align data including discrete position estimates. Furthermore, the techniques can also include interpolating discrete position estimates if, for example, a first sample set lacks a corresponding (for the same time) position estimate from a second set. Additional example techniques for accounting for position information sets having different numbers of position estimate samples can include ignoring samples not shared between the sets, averaging adjacent samples into a fewer number of samples, etc.

The differences between the position estimates can then be averaged according to the following equation:

$$\overline{\Delta} = \frac{1}{K}\sum_{n=1}^{K}|\Delta(t_n)|,$$

wherein $\overline{\Delta}$ represents the averages of the differences $\Delta$, K represents a total number of position estimates, and $\Delta$ represents a difference between each position estimate, as disclosed herein. Although the provided equation includes use of an absolute measurement modifier to generate new vector(s) representing the average differences, other operations can also be used (such as an exponential operation being performed on the differences between each of the position estimates). It should be understood that if each discrete position estimate includes multiple components and/or forms a vector, then $\Delta(t_n)$ and $\overline{\Delta}$ may include multiple components and/or be vectors as well and can each be represented by a matrix.

The averages of the differences $\overline{\Delta}$ can then be used to generate a scalar value indicating a degree of associativity. For example, a degree of associativity D can be generated via the equation: $D=\overline{\Delta}^T*W*\overline{\Delta}$, where $\overline{\Delta}$ represents the averages of differences $\Delta$ (as before), $\overline{\Delta}^T$ represents a transpose of $\overline{\Delta}$, and W represents a weighting matrix. If, for example, $\overline{\Delta}$ is represented by a 6×1 matrix, then $\overline{\Delta}^T$ can be a 1×6 matrix. W can be chosen to be a 6×6 matrix. Thus, the operation can result in a scalar value D. D can be compared to a threshold value representing an acceptable degree of association between devices to warrant associating the devices. For example, in certain embodiments, if D is less than or equal to a threshold, then two devices that were compared can be deemed to be associated. The threshold value can be selected and can be variable depending upon certain conditions. For example, a threshold value can be adjusted depending upon a specific use of enhancing functionality of associated devices. A concert announcement, for example, may wish to be forwarded to users with a higher threshold than a wedding venue announcement (if the higher threshold corresponds to a less stringent requirement to determine an association). Thus, various degrees of associativity can be determined using the techniques disclosed herein. The threshold value can also be adjusted depending upon certain conditions of devices, such as their approximate locations (e.g., mobile devices in urban environments may require a more stringent requirement to be associated given generally more compact living and travel conditions of urban environments as compared to a more rural setting), known events (e.g., thresholds can be made more stringent if a parade or other event is known to be occurring in the vicinity which users may be attending), or for other reasons. Thresholds can be adjusted depending upon a time of day, for example. Relatively late at night, threshold can be made more stringent, for example, indicating that users are likely to be more proximate to associated users during these time periods. The preceding examples are non-limiting and threshold(s) can be adjusted using a combination of the preceding factors or other factors not specifically listed.

The weighting matrix can be used to weight components of $\overline{\Delta}$ in relation to other components of $\overline{\Delta}$. For example, Global Positioning Systems (GPS) can be more accurate when determining positions (or velocities or accelerations) in directions lateral to a surface of the earth. Elevation or altitude measurements by GPS systems may be relatively less accurate. A weighting matrix W can be selected wherein x, y, $v_x$, and $v_y$ components of $\overline{\Delta}$ are weighted more heavily than z and $v_z$ components, for example. A weighting matrix can take the form of W=diag([σ1, σ1, β1, σ2, σ2, β2]) when weighting a $\overline{\Delta}$ vector of form $\overline{\Delta}=\{\overline{\Delta}x, \overline{\Delta}y, \overline{\Delta}z, \overline{\Delta}v_x, \overline{\Delta}v_y, \overline{\Delta}v_z\}$, to, for example, weight lateral corresponding components x and y equally and weight elevation corresponding components z less than the x and y components (e.g., β1 can be less than σ1, and β2 can be less than σ2). The weighting matrix can be selected to be a diagonal matrix if assumptions are made that errors in each direction (each corresponding to a component) are independent. Otherwise, W can be selected to be a non-diagonal matrix (which can lead to more complex operations when performing the degree of associativity computation).

If errors in each direction are dependent, then additional techniques can be used. For example, equation $R=M[[(\overline{\Delta}-M(\overline{\Delta})][\overline{\Delta}-M(\overline{\Delta})]^T]$, can be used to determine covariance matrix R, wherein M represents a mean function and $\overline{\Delta}$ represents the averages (means) of differences between position information. Weight matrix W can then be chosen to equal an inverse of covariance matrix R (i.e., $R^{-1}$). The covariance matrix can be found using statistical or other information gathered from a position information set.

Value(s) of W can be determined based on performing statistical analysis of historic or training data regarding positioning of mobile devices. For example, a known reference position can be compared to an estimated position to, for example, determine a difference between the estimated position and the known position in different component directions. The differences in the components can be used to determine weighting factors which can indicate a degree of accuracy for each of the components. W can also be modified depending upon various other information. For example, if it is determined that a mobile device is receiving attenuated GNSS locating signals because, for example, the mobile device is in an urban environment or in a canyon, then weighting can be modified (for certain time periods, for example, wherein the mobile device is receiving attenuated signals). Additionally, characteristics of GNSS receivers themselves can be used to modify weighting values. For example, certain models of GNSS receivers can provide more accurate positioning values in certain directions (e.g., components) as compared to others. In certain embodiments, values of W can be determined using regression or other statistical analyses of historic positioning data. W can be chosen to be a positive semi-definite matrix in order to, for example, simplify calculation of a scalar representation of a degree of association.

Server 118 can implement the preceding techniques to determine whether two or more mobile devices should be associated. In certain embodiments, a test can be performed wherein two mobile devices can be selected to determine if the two devices should be associated. The two devices can be chosen randomly from a set of available mobile devices having associated position information or through other techniques. K samples of position estimates can then be collected from both of the mobile devices. These values can be used with the preceding techniques to determine D, a measure of association, for the K samples to determine if the K values meet a threshold for associating the K samples. If the two devices are determined not to meet the threshold, then additional samples can be collected from the two devices or different devices selected. Note that position data from devices can be evaluated in parallel (e.g., different mobile devices' position information can be evaluated concurrently or different data sets corresponding to different time periods but the same mobile device can be evaluated concurrently). If the two devices are determined to meet the threshold and are to be associated, then server 118 can save a flag or attribute associated with the devices indicating that they are associated.

Detection Fusion

Figure 2A:
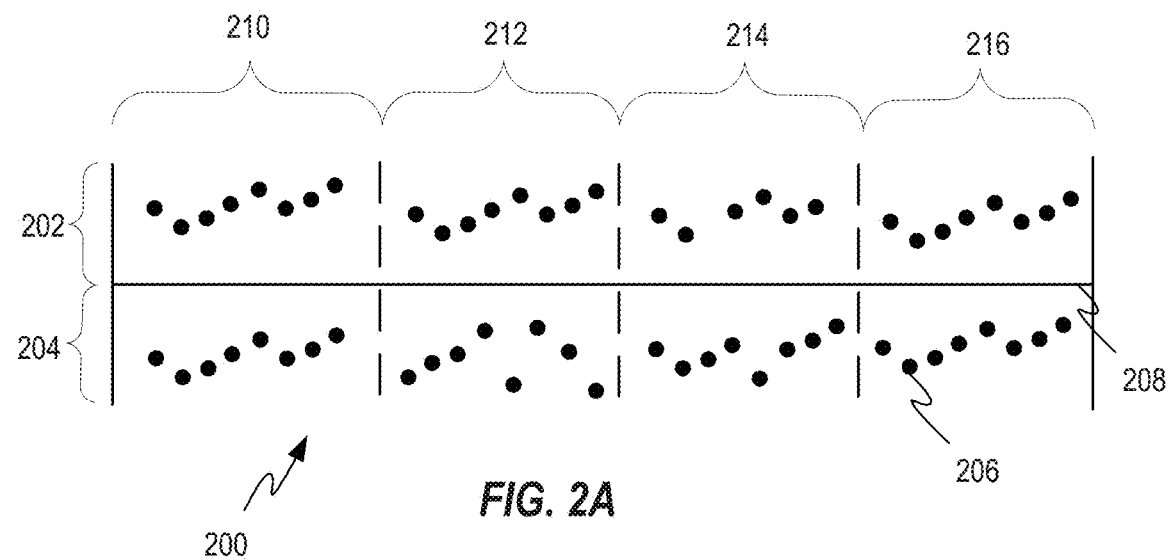
FIGS. 2A and 2B illustrates position estimates over time periods to illustrate features of the disclosure.
Figure 2B:
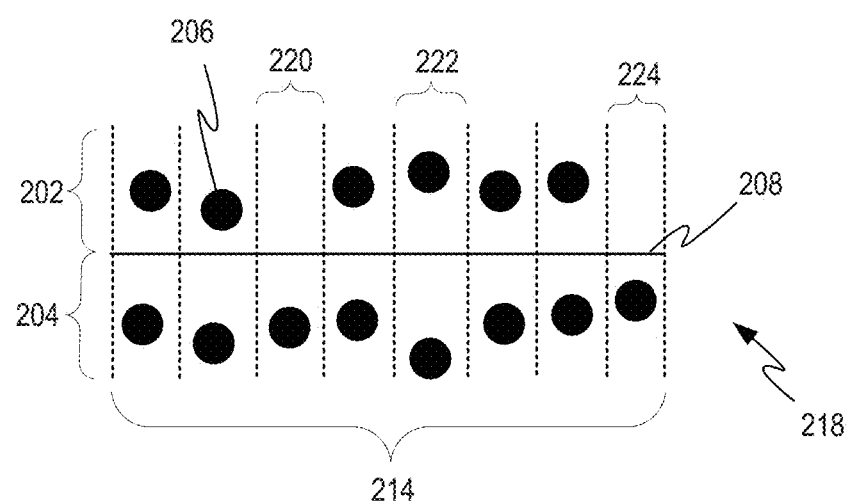

FIGS. 2A and 2B illustrates position estimates over time periods to illustrate features of the disclosure. In FIG. 2A, illustrated is a graph 200 including a plurality of position estimates 206 graphed over time on timeline 208. Although graph 200 is illustrated as a two dimensional graph, it should be understood that each position estimate 206 can include several components each corresponding to a dimension and/or a measurement in a dimension (e.g., x, y, and z components of position, velocity, and/or acceleration). Graph 200 is a simplified graph to illustrate features of the disclosure. Illustrated is position information 202 that can correspond to a first mobile devices and position information 204 that can correspond to a second mobile device. As shown, position information can include position estimates 206 sampled discretely at different times along timeline 208. Furthermore, position estimates can be compared over time using, for example, techniques disclosed herein regarding functionality of server 118, for example, As illustrated, the first mobile device and second mobile device can be determined to be associated according to position information sampled during time period 210 (and time period 216). For example, the position estimates for the two devices have similar corresponding values at each time sampled during time period 210. However, during time period 212, the first and second mobile devices can be determined not to be associated. This can be visualized as illustrated in FIG. 2A wherein the position estimates for the two mobile devices during time period 212 are not congruent and follow different trends representing differing position estimate values.

For time period 214, the first device and second device can be determined to be associated using a technique known as detection fusion. FIG. 2B illustrates a breakout 218 of the position estimates illustrated in FIG. 2A occurring during time period 214. Time period 214 can be further subdivide into smaller discrete time period portions (each including one or more discrete position estimates). Although during all of time period 214, the position estimates of the two mobile devices are not congruent, the two devices can still be determined to be associated. For example, during time periods 220, 222, and 224, discrete position estimates 206 between the two mobile devices are not congruent. During time periods 220 and 224, the first device is missing a corresponding position estimate. During time period 222, the position estimate for the first mobile device differs significantly from the position estimate for the second mobile device. However, overall, during time period 214, position information for the first mobile device is congruent to position information for the second mobile device (e.g., in five of the eight further delineated time periods illustrated in FIG. 2B, the position estimates are congruent). Thus, a threshold number of micro time periods within a larger micro time period can be used to determine if devices should be associated.

FIGS. 2A and 2B illustrate a technique of detection fusion wherein time period(s) can be further delineated into micro or combined into macro time periods to aid in assessing if mobile devices should be associated. For example, during time period 214, two devices can be associated even though there are micro time periods within where position estimates are not congruent. Similarly, two devices can be determined to be associated based on position information captured across timeline 208 even though two devices' position information may not be congruent during time period 212. Using these techniques, deviations can be accounted for wherein users temporarily may not appear be co-located or moving together (e.g., due to measurement errors) but over a longer time period (or for a longer trend) maintain a close positional relationship.

Large Data Set Association Determination

Figure 3:
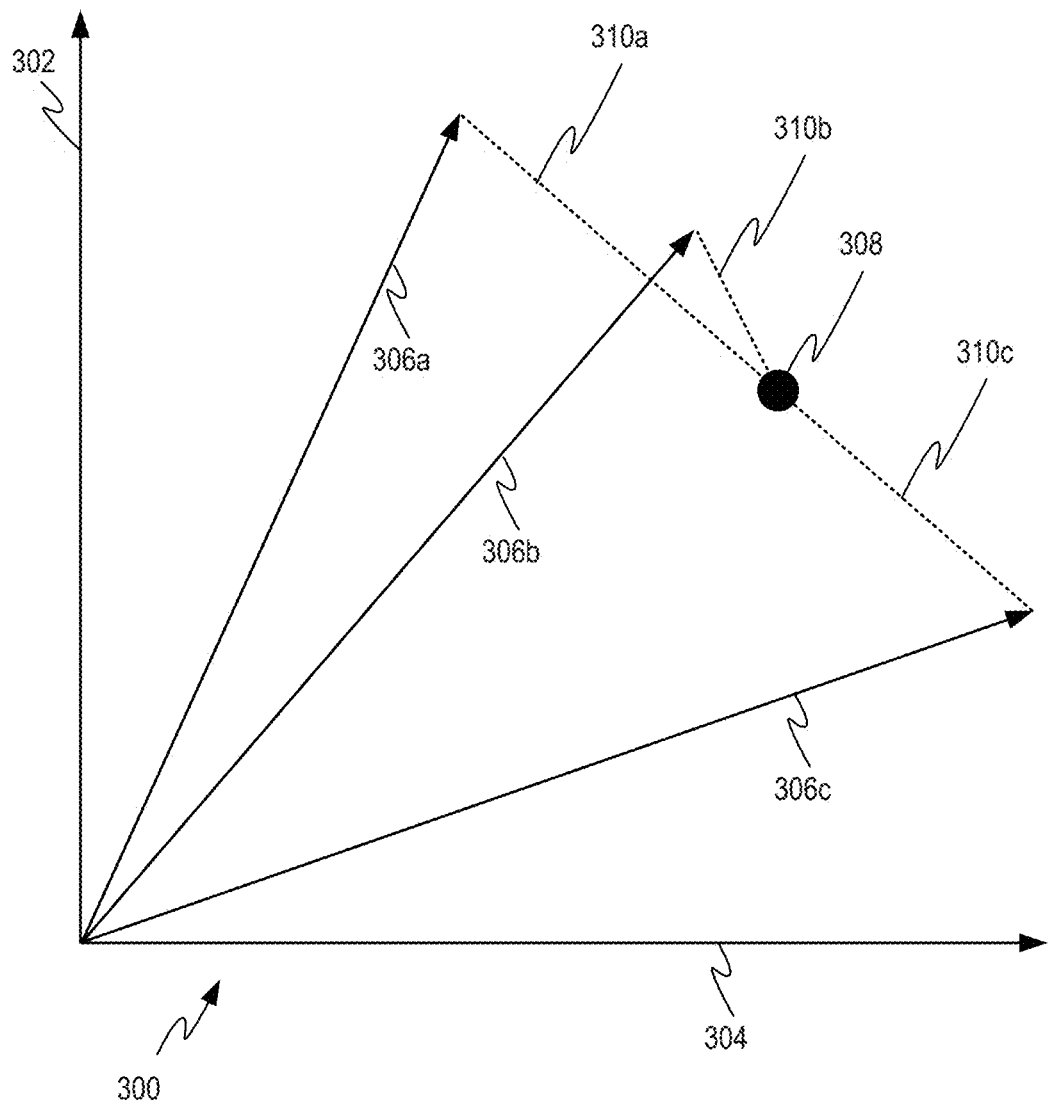
FIG. 3 is a graphical representation of position estimates to illustrate features of the disclosure.

FIG. 3 illustrates a graph showing a graphical representation of position estimates to illustrate features of the disclosure. In FIG. 3, a graph 300 is illustrated including two axes 302 and 304. Each of axes 302 and 304 can represent corresponding components of a position estimate (or a difference or average) that can each be represented as a vector. Although only two axes are illustrated, it should be understood that the techniques illustrated by FIG. 3 can be implemented using vectors including additional components.

In graph 300, three different vectors (306a, 306b, and 306c) are plotted which can each correspond to a position estimate of a corresponding mobile device or can each correspond to a position estimate of a single mobile device in various combinations. For example, a first mobile device can correspond to vector 306a, a second mobile device can correspond to vector 306b, and a third mobile device can correspond to vector 306c. As another example, a first mobile device can correspond to vectors 306a and 306b and a second mobile device can correspond to vector 306c.

Using the techniques described herein, an association can be determined between two mobile devices (using server 118, for example). However, if there is a larger data set including position information for more than two mobile devices, the binary nature of the techniques to determine an association between two devices can lead to ambiguity. Additionally, the techniques may be difficult to scale to a relatively large number of mobile devices.

Disclosed are techniques that can be used on multiple mobile devices of any number and can avoid ambiguities and/or be implemented using relatively fewer computer device resources. The techniques can begin with a plurality of position estimates mx, wherein x represents a number indicating a corresponding mobile device in a set of mobile devices among which association is to be determined. Using the equation $$E(t_n) = \frac{1}{P}\sum_{x=1}^{P} m_x(t_n),$$

where E is an average center, P is a total number of mobile devices within the set, x represents the $x^{th}$ mobile device in the set, and t denotes a time domain value (wherein $1 \le n \le K$ samples), the average center E of the position estimates m can be determined. For example, 308 can represent the average center E of vectors 306a, 306b, and 306c, each representing to a position estimate of a corresponding mobile device. Thus, distances 310a, 310b, and 310c can represent respective distances between vectors 306a, 306b, and 306c to center 308.

The distances 310a, 310b, and 310c can be determined using the expression $d_p(t_n)=|E(t_n)-m_p(t_n)|$, wherein d represents respective distances between each mobile device and the center E (for each discrete time corresponding to a position estimate). Note that, as before, different operations can be used in place of or to supplement the absolute value operation. Similar to the previously disclosed methodology, a degree of association can be determined using equation $D_p(t_n)=d_p(t_n)^T*W*d_p(t_n)$, where W represents a weighting matrix (as before). Next a maximum value of each degree can be determined from $D_p(t_n)$. If this value meets a threshold, then the mobile devices in the set can be associated. However, if the maximum value exceeds the threshold, then the position information corresponding to the maximum value can be removed from consideration for association with the remaining mobile devices and new centers determined. In certain embodiments, position information of multiple devices can be removed from consideration if their degree of association exceeds a threshold. Using these techniques, the degree of association can be iteratively repeated to determine if mobile terminals are to be associated. In each iteration, position information can be removed and new centers, distances to centers, and degrees of association can be determined.

Motion Transition

Figure 4:
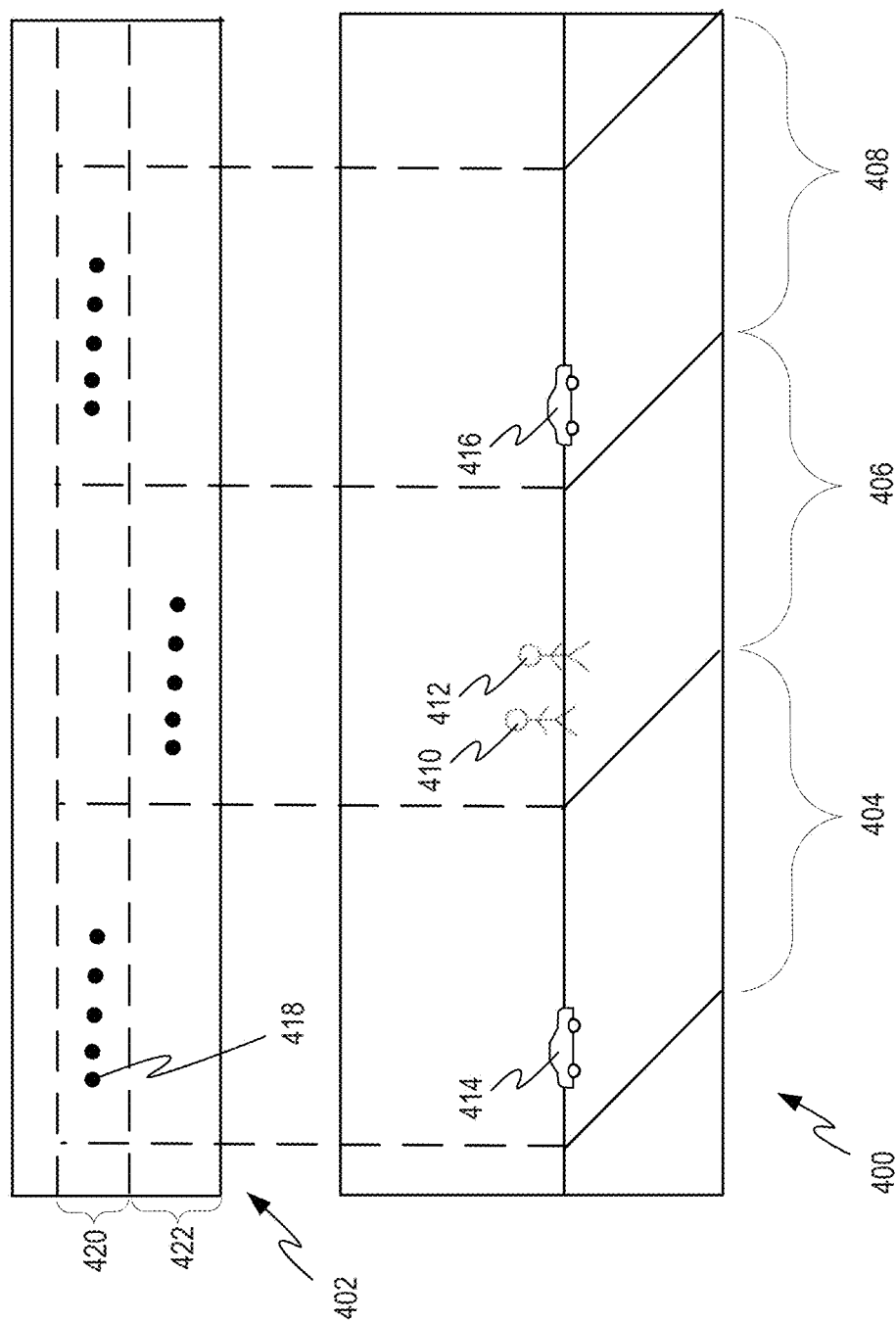
FIG. 4 is a graphical representation of various time periods associated with different states of users to illustrate features of the disclosure.

FIG. 4 illustrates a graphical representation of various time periods associated with different states of users to illustrate features of the disclosure. In FIG. 4, a scene 400 is included with an associated graph 402. Scene 400 and graph 402 include corresponding time periods 404, 406, and 408. In scene 400, two users 410 and 412 are illustrated as traveling during time periods 404, 406, and 408. Each of users 410 and 412 can carry a mobile device (not shown). During time period 404, users 410 and 412 can travel within vehicle 414. During time period 406, users 410 and 412 can be walking before using vehicle 416 during time period 408.

Graph 402 includes multiple discrete velocity samples 418 corresponding to users 410 and/or 412. As illustrates, the velocities during time periods 404 and 408 can be greater than velocities during time period 406. During time periods 404 and 408, a determination can be made if, for example, two users 410 and 412 were roughly collocated and determined to have increased velocity (possibly in a similar manner) above a threshold, indicating that the users entered a vehicle (such as vehicle 414). If so, then the determination of association using the techniques discussed above (such as calculation of the D value) can be suspended for time period 404 to minimize processing overhead, for example. For example, velocities (or average velocities) within range 422 can indicate that users 410 and 412 are collocated within a vehicle, causing the determination of association to be suspended. Velocities (or average velocities) within range 420 can indicate that users 410 and 412 are not traveling in a vehicle, causing the determination of association to resume. Furthermore, determination that two users enter a vehicle together can be used to determine an association itself. For example, a determination can be made that users are collocated and moving together during time period 408. If the same two users met together at the end of time period 406 to enter the same vehicle while traveling during time period 408, this may indicate an association between the users. It can be concluded that the two users enter the same vehicle by determining, for example, that the mobile device of the two users travel at a relatively low velocity (indicating that they are not in a vehicle) and are collocated in close proximity during and/or after a transition from the relatively low velocity to a relatively high velocity (indicated that they have entered a vehicle together).

In certain embodiments, a threshold (such as between ranges 420 and 422) can be used to indicate whether two mobile devices are traveling within a vehicle. A number of collocated mobile devices can also be used to indicate if an association is to be determined between the users. For example, if a relatively large number of mobile devices are traveling in close proximity at relatively high velocity, this may indicate that the users of the mobile devices are traveling using public transportation (e.g., a bus, plane, or train). This may indicate a lower probability that the mobile devices of the users are to be associated. In certain embodiments, a velocity can be used as a baseline to determine whether two mobile devices are to be associated. For example, if two users are traveling on a train, the velocity of the train can be used as a relative baseline to determine if two mobile devices are moving together within the train. If so, a determination can be made that the two mobile devices are to be associated.

Unsynchronized Geo-Stream Fusion

Figure 5A:
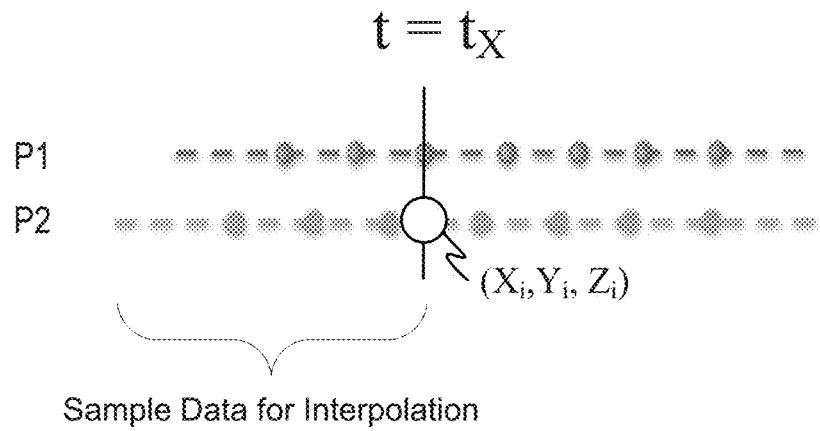
FIGS. 5A and 5B illustrate examples interpolating position estimates to illustrate features of the disclosure.
Figure 5B:
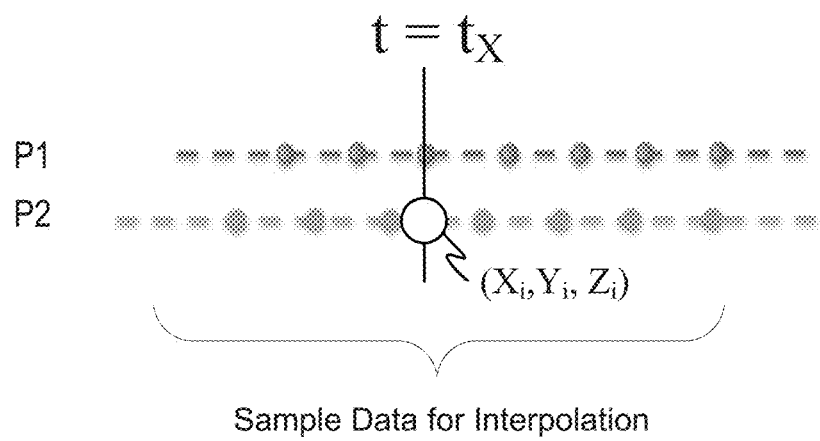

FIGS. 5A and 5B show unsynchronized streams of position estimates P1 and P2 (also referred to as sets of position estimates P1 and P2). The position estimates from P2 are clearly not time-aligned with the position estimates from P1. Before determining a degree of association, at least one of the streams of position estimates can be processed to generate interpolated position estimates that are time-aligned with the position estimates of the other stream. For example, referring to FIG. 5A, stream P1 has a position estimate at $t=t_x$. However, stream P2 does not have a position estimate at $t=t_x$. This is because stream P2 is not time-aligned with stream P1. Instead, at $t=t_x$, stream P2 is "in between" data samples. According to various embodiments, an interpolation technique can be employed to generate an interpolated position estimate $(X_i, Y_i, Z_i)$ at $t=t_x$ for P2, based on data samples that are available in stream P2.

Position $(X_i, Y_i, Z_i)$ represents an interpolated position estimate at $t=t_x$, interpolated from available, but not time-aligned (i.e., not at $t=t_x$), position estimates from stream P2. Generally speaking, the more data samples used in an interpolation, the better the interpolation result. Various forms of linear and non-linear interpretation techniques can be applied, as would be understood by one of ordinary skill in the art. These techniques may include linear interpolation, polynomial interpolation, spline interpolation, and/or others.

FIG. 5A shows an exemplary real-time interpolation of unsynchronized streams of position estimates. Real-time interpolation techniques can be used when associations are to be determined while two (or more) stream of position estimates P1 and P2 are received. In other words, the degree of association can be computed at or near time $t=t_x$. Note that at time $t=t_x$, the only available sample points from streams P1 and P2 are those shown in FIG. 5A as being at or to the "left" of $t=t_x$ (i.e., present and past position estimates). Position estimates from streams P1 and P2 that are shown in FIG. 5A as being to the "right" of $t=t_x$ (i.e., future position estimates), have not yet been received. Thus, for real-time fusion, the interpolated position estimates $(X_i, Y_i, Z_i)$ can only be based on the interpolation of data points from stream P2 that are at or to the "left" of $t=t_x$. This has a practical impact on the interpolation operation. As discussed previously, generally speaking, the more data samples used in the interpolation, the better the interpolation result.

FIG. 5B shows an exemplary post-process interpolation of unsynchronized streams of position estimates. Post-process techniques can be used when associations can be determined after the two (or more) streams of position estimates P1 and P2 have been received. Thus, can be computed at a later time when all the position estimates from streams P1 and P2 shown in FIG. 5A or 5B have been received, including position estimates at or to the "left" of $t=t_x$ and position estimates to the "right" of $t=t_x$. Thus, for post-process interpolation, interpolated position estimate $(X_i, Y_i, Z_i)$ can be based on all position estimates from stream P2. Post-process interpolation can provide more position estimates that can be used for interpolation. Compared to real-time interpolation, post-process interpolation can generate more accurate interpolated position estimates.

Figure 6:
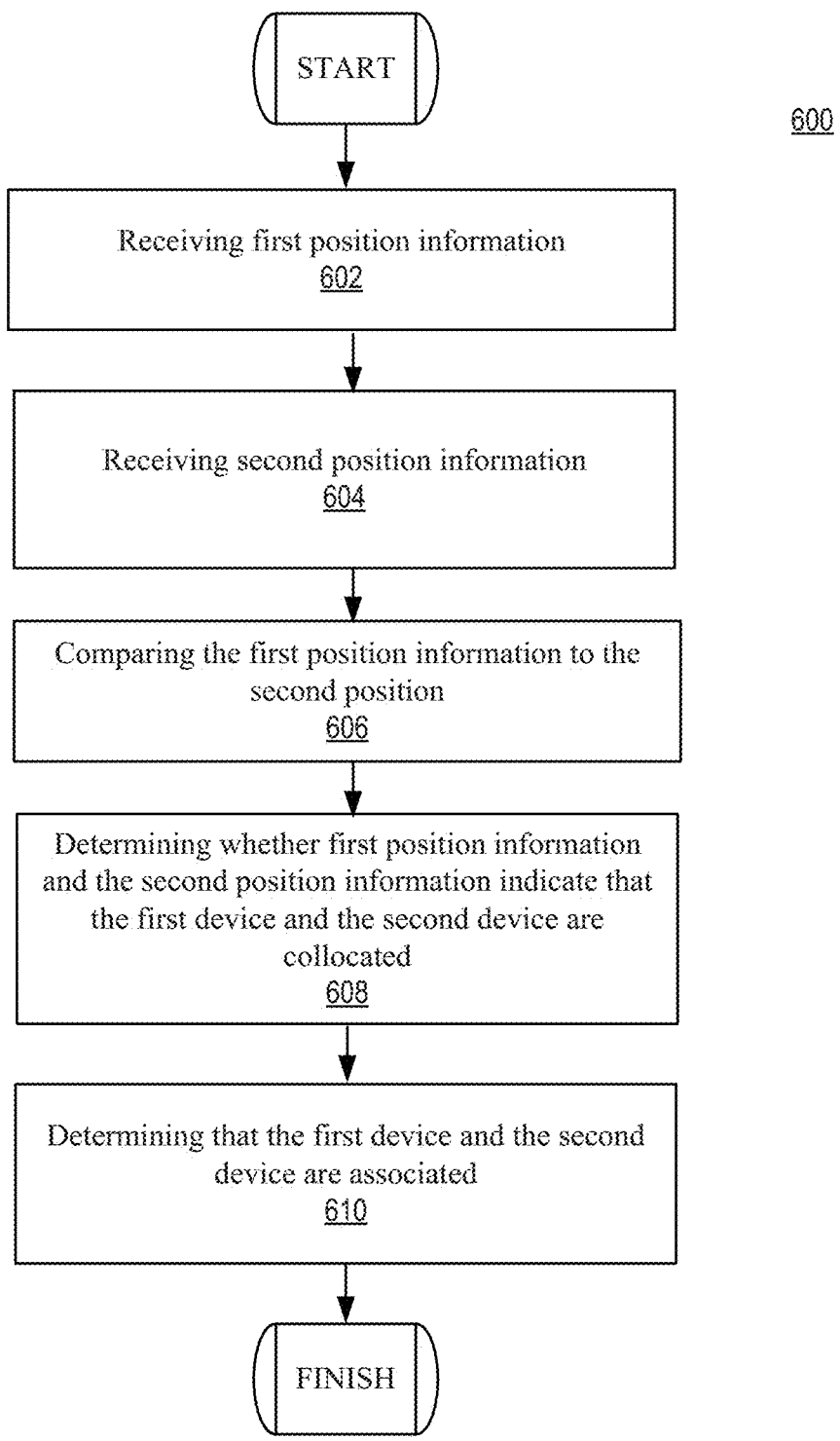
FIG. 6 is a flowchart including features of the disclosure.

FIG. 6 illustrates a flowchart 600 illustrating techniques of the disclosure. At 602, first position information can be received. The first position information can be received by server 118, for example. The first position information can include a first plurality of position estimates determined by a GNSS receiver of the first device. The first plurality of position estimates can be associated with a first plurality of time stamps within a first time period. At 604, second position can be received. The second position information can be received by server 118, for example. The second position information can include a second plurality of position estimates determined by a GNSS receiver of the second device. The second plurality of position estimates can be associated with a first plurality of time stamps within a second time period, wherein a portion of the second time period overlaps with the first time period.

At 606, the first position information can be compared with the second position information using techniques disclosed herein including, for example, determination of a degree of association between the first position information and the second position information. At 608, a determination can be made as to whether the first position information and the second position information indicate that the first device and the second device are collocated. For example, the degree of association can be compared to a threshold. At 610, based on the comparing, the first device can be determined to be associated with the second device.

Figure 7:
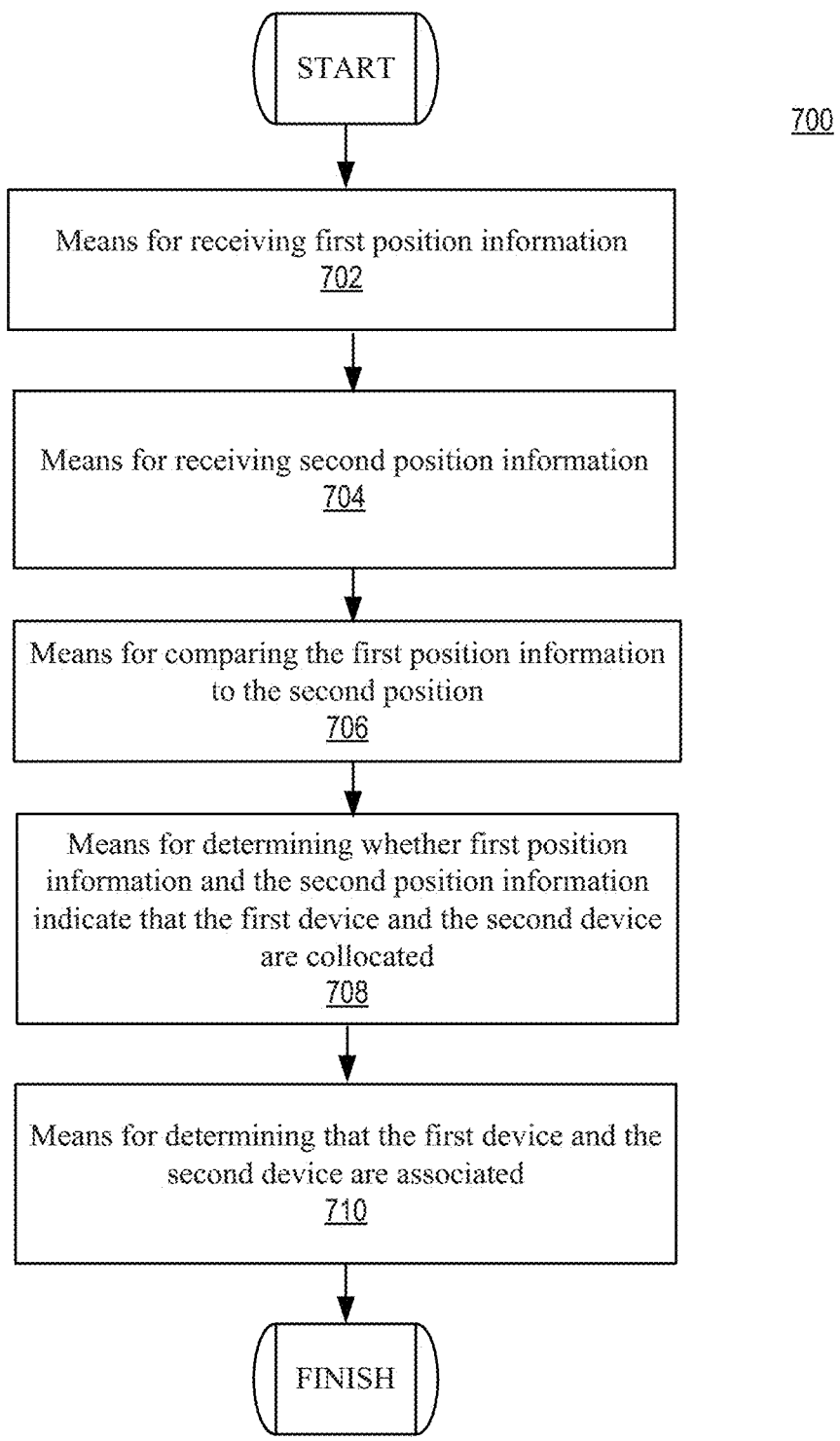
FIG. 7 is a flowchart including features of the disclosure.

FIG. 7 illustrates a flowchart 700 illustrating techniques of the disclosure. At 702 is a means for receiving first position information. The means can include, for example, a transceiver of server 118, for example. The first position information can include a first plurality of position estimates determined by a GNSS receiver of the first device. The first plurality of position estimates can be associated with a first plurality of time stamps within a first time period. At 704 is a means for receiving second position information. The means can include, for example, a transceiver of server 118. The second position information can include a second plurality of position estimates determined by a GNSS receiver of the second device. The second plurality of position estimates can be associated with a first plurality of time stamps within a second time period, wherein a portion of the second time periods overlaps with the first time period.

At 706 is a means for comparing the first position information to the second position information using techniques disclosed herein including, for example, determination of a degree of association between the first position information and the second position information. The means for comparing the first position information to the second position information can include, for example, logic of server 118. At 708 is a means for determining whether the first position information and the second position information indicate that the first device and the second device are collocated that can include, for example, logic of server 118. For example, the degree of association can be compared to a threshold. At 710 is a means for, based on the comparing, determining that the first device is associated with the second device that can be include, for example, logic of server 118.

Example Computer Systems and Devices

Figure 8:
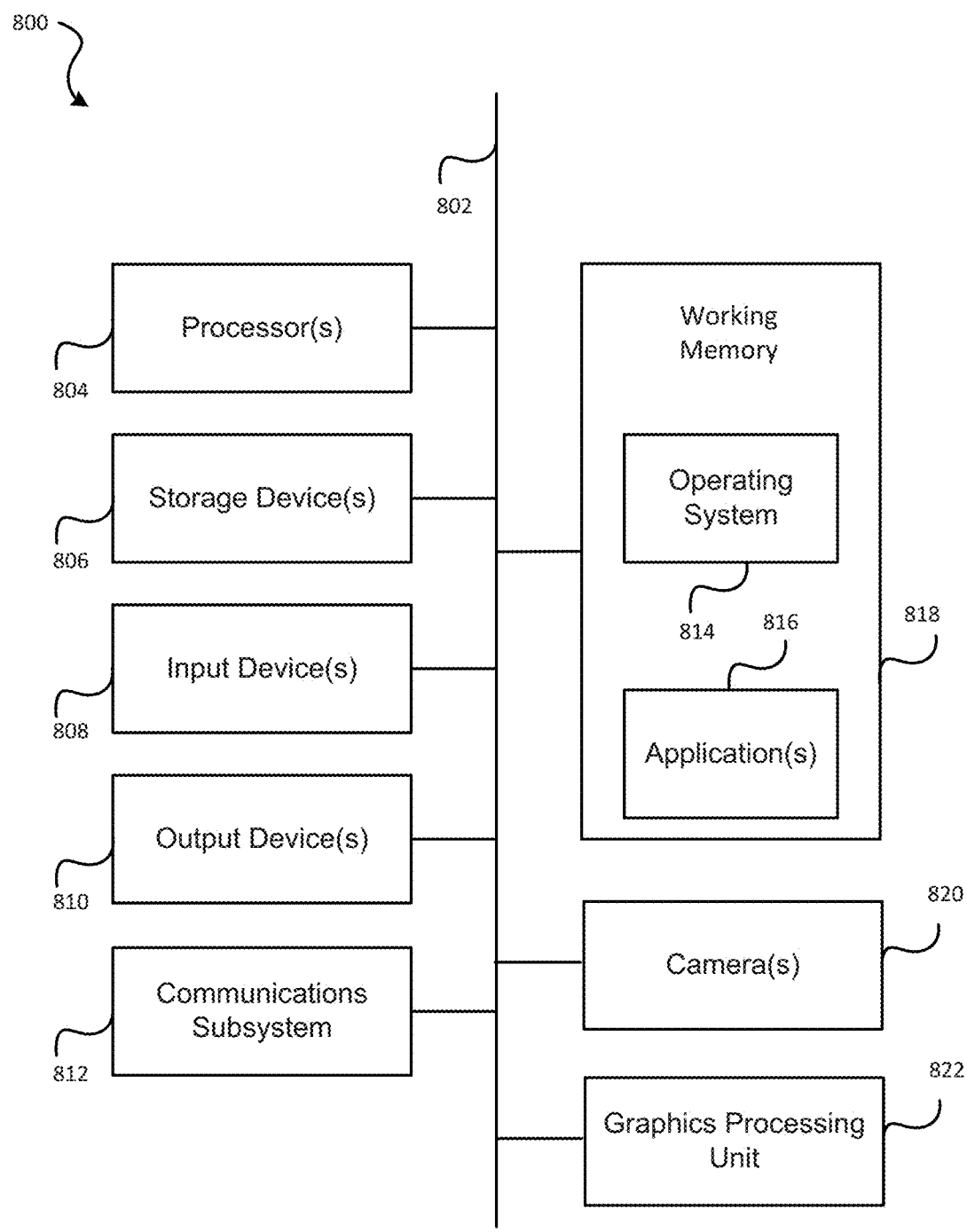
FIG. 8 illustrates an example of a computing system in which one or more embodiments may be implemented, according to embodiments of the present disclosure.

FIG. 8 illustrates an example of a computer system 800 in which one or more implementations may be implemented. Server 118 can be an example of computer system 800.

Computer system 800 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 8 provides a schematic illustration of one implementation of a computer system 800 that can perform the methods provided by various other implementations, as described herein, and/or can function as the host computer system, a remote kiosk/terminal, a point-of-sale device, a telephonic or navigation or multimedia interface in an automobile, a computing device, a set-top box, a table computer and/or a computer system. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics processing units 822, and/or the like); one or more input devices 808, which can include without limitation one or more cameras, sensors, a mouse, a keyboard, a microphone configured to detect ultrasound or other sounds, and/or the like; and one or more output devices 810, which can include without limitation a display unit such as the device used in implementations of the invention, a printer and/or the like.

In some implementations of the implementations of the invention, various input devices 808 and output devices 810 may be embedded into interfaces such as display devices, tables, floors, walls, and window screens. Furthermore, input devices 808 and output devices 810 coupled to the processors may form multi-dimensional tracking systems.

The computer system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 812, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 812 may permit data to be exchanged with a network, other computer systems, and/or any other devices described herein. In many implementations, the computer system 800 will further comprise a non-transitory working memory 818, which can include a RAM or ROM device, as described above.

The computer system 800 also can comprise software elements, shown as being currently located within the working memory 818, including an operating system 814, device drivers, executable libraries, and/or other code, such as one or more application programs 816, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 806 described above. In some cases, the storage medium might be incorporated within a computer system, such as computer system 800. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 800 may be omitted or may be implemented separate from the illustrated system. For example, the processor 804 and/or other elements may be implemented separate from the input device 808. In one implementation, the processor may be configured to receive images from one or more cameras that are separately implemented. In some implementations, elements in addition to those illustrated in FIG. 8 may be included in the computer system 800.

Some implementations may employ a computer system (such as the computer system 800) to perform methods in accordance with the disclosure. For example, some or all of the procedures of the described methods may be performed by the computer system 800 in response to processor 804 executing one or more sequences of one or more instructions (which might be incorporated into the operating system 814 and/or other code, such as an application program 816) contained in the working memory 818. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 800, various computer-readable media might be involved in providing instructions/code to processor(s) 804 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various implementations of the invention.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 806 either before or after execution by the processor(s) 804.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Although the disclosure has been described with respect to specific embodiments, it will be appreciated that the disclosure is intended to cover all modifications and equivalents within the scope of the following claims.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling operations of a navigation system or as computer readable code on a computer readable medium for controlling the operation of an automobile in accordance with a navigation route. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method determining geographic associations, comprising:
    receiving first position information from a first Global Navigation Satellite System (GNSS) receiver of a first device, wherein the first position information comprises a first plurality of position estimates of the first device, the first plurality of position estimates associated with a first plurality of time stamps within a first time period;
    receiving second position information from a second GNSS receiver of a second device, wherein the second position information comprises a second plurality of position estimates of the second device, the second plurality of position estimates associated with a second plurality of time stamps within a second time period wherein a portion of the second time period overlaps with the first time period;
    comparing, by a processor, the first position information to the second position information over the overlapping time period;
    determining, by the processor, based on the comparing, whether first position information and the second position information indicate that the first device and the second device are collocated during the overlapping time period; and
    upon determining that the first position information and the second position information indicate that the first device and the second device are collocated during the overlapping time period, determining, by the processor, that the first device and the second device are associated.

2. The method of claim 1, wherein the determining whether first position information and the second position information indicate that the first device and the second device are collocated during the overlapping time period comprises determining whether a difference between position estimates of the first position information and position estimates of the second position information meets a threshold.

3. The method of claim 1, wherein the overlapping time period comprises at least one intervening time period wherein the first device and the second device are not collocated.

4. The method of claim 1, wherein the first position information comprises velocity information for the first device and the second position information comprises velocity information for the second device, wherein the determining whether first position information and the second position information indicate that the first device and the second device are collocated during the overlapping time period is based on the velocity information for the first device and the velocity information for the second device.

5. The method of claim 1, wherein the comparing the first position information to the second position information over the overlapping time period comprises determining a difference between each of the first plurality of position estimates and a corresponding one of the second plurality of position estimates.

6. The method of claim 5, wherein the comparing comprises determining an average of the differences.

7. The method of claim 6, wherein the comparing comprises applying a weighting to components of the average of the differences; wherein the components each indicate a direction in three dimensional space; and
    wherein the weighting weights a first component of the components differently from a second component of the components.

8. The method of claim 7, wherein the first component indicates a position lateral to a surface of the earth, the second element indicates an elevation above the surface of the earth, and the weighting of the first component is greater than the weighting of the second component.

9. The method of claim 7, wherein the weighting comprises performing a matrix operation, wherein the matrix operation comprises multiplying a first matrix including the components of the average of the differences with a diagonal matrix including weighting factors.

10. The method of claim 1, further comprising:
    receiving third position information from a third GNSS receiver of a third device, wherein the third position information comprises a third plurality of position estimates of the third device, the third plurality of position estimates associated with a third plurality of time stamps, wherein the third position information comprises position estimates within a third time period wherein a portion of the third time period overlaps with the first time period and the second time period;

comparing the first position information, the second position information, and the third position information over the overlapping time period;

determining, based on the comparing, whether first position information, the second position information, and the third position information indicate that the first device, the second device, and the third device are collocated together during the overlapping time period;

upon determining that the first position information, the second position information, and the third position information indicate that the first device, the second device, and the third device are collocated during the overlapping time period, determining that the first device, the second device, and the third device are associated.

11. The method of claim 10, wherein the respective position estimates of each of the first position information, the second position information, and the third position information each comprises a position estimate in multi-dimensional space;

the method further comprises determining a geometric center for each of the position estimates; and the comparing comprises comparing each of the position estimates with the geometric center.

12. The method of claim 1, further comprising: time synchronizing, based on the first plurality of time stamps and the second plurality of time stamps, the second position information with the first position information.

13. The method of claim 1, wherein the determining whether the first device and the second device are collocated comprises determining whether the first device and the second device move together during the overlapping time period.

14. A navigation system, comprising:
a first device comprising a first Global Navigation Satellite System (GNSS) receiver;
a second device comprising a second GNSS receiver; and
a processor configured to:
receive first position information from a first Global Navigation Satellite System (GNSS) receiver of a first device, wherein the first position information comprises a first plurality of position estimates of the first device, the first plurality of position estimates associated with a first plurality of time stamps within a first time period;
receive second position information from a second GNSS receiver of a second device, wherein the second position information comprises a second plurality of position estimates of the second device, the second plurality of position estimates associated with a second plurality of time stamps within a second time period wherein a portion of the second time period overlaps with the first time period;
compare the first position information to the second position information over the overlapping time period;
determine, based on the comparing, whether first position information and the second position information indicate that the first device and the second device are collocated during the overlapping time period; and
upon determining that the first position information and the second position information indicate that the first device and the second device are collocated during the overlapping time period, determine that the first device and the second device are associated.

15. The navigation system of claim 14, wherein the determining whether first position information and the second position information indicate that the first device and the second device are collocated during the overlapping time period comprises determining whether a difference between position estimates of the first position information and position estimates of the second position information meets a threshold.

16. The navigation system of claim 14, wherein the overlapping time period comprises at least one intervening time period wherein the first device and the second device are not collocated.

17. The navigation system of claim 14, wherein the first position information comprises velocity information for the first device and the second position information comprises velocity information for the second device, wherein the determining whether first position information and the second position information indicate that the first device and the second device are collocated during the overlapping time period is based on the velocity information for the first device and the velocity information for the second device.

18. The navigation system of claim 14, wherein the comparing the first position information to the second position information over the overlapping time period comprises determining a difference between each of the first plurality of position estimates and a corresponding one of the second plurality of position estimates.

19. The navigation system of claim 18, wherein the comparing comprises determining an average of the differences.

20. A device for determining geographic associations, comprising:
a means for receiving first position information from a first Global Navigation Satellite System (GNSS) receiver of a first device, wherein the first position information comprises a first plurality of position estimates of the first device, the first plurality of position estimates associated with a first plurality of time stamps within a first time period;
a means for receiving second position information from a second GNSS receiver of a second device, wherein the second position information comprises a second plurality of position estimates of the second device, the second plurality of position estimates associated with a second plurality of time stamps within a second time period wherein a portion of the second time period overlaps with the first time period; a means for comparing the first position information to the second position information over the overlapping time period;
a means for determining, based on the comparing, whether first position information and the second position information indicate that the first device and the second device are collocated during the overlapping time period; and
a means for, upon determining that the first position information and the second position information indicate that the first device and the second device are collocated during the overlapping time period, determining that the first device and the second device are associated.

* * * * *